Patented Apr. 7, 1931

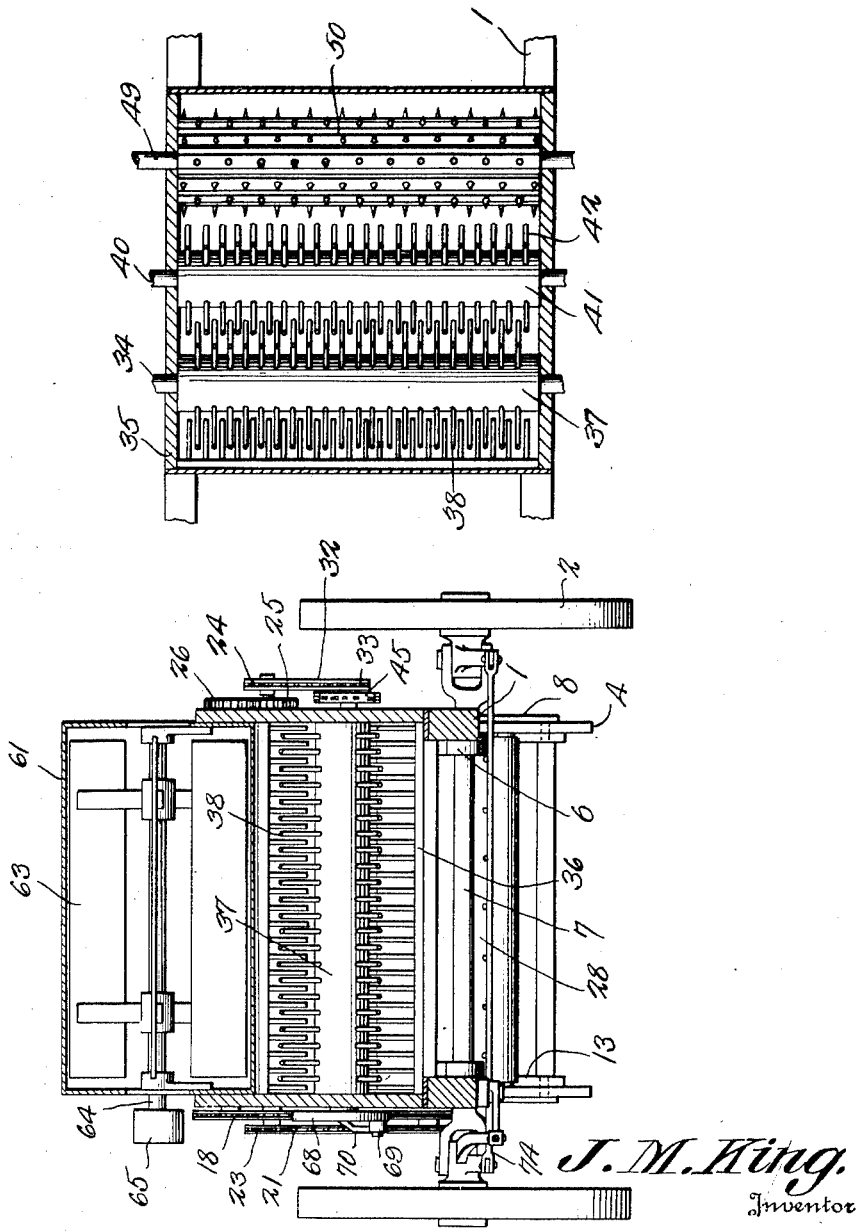

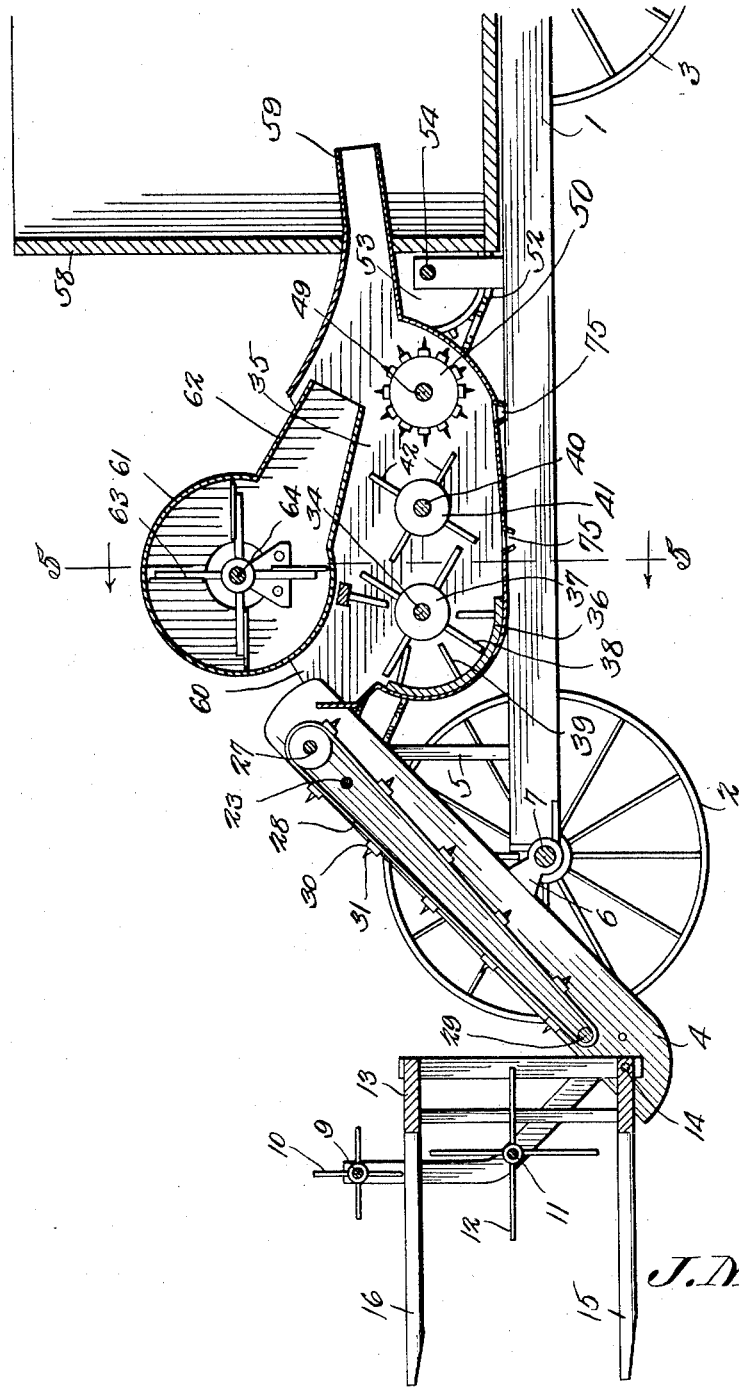

1,800,145

UNITED STATES PATENT OFFICE

JOHN M. KING, OF AMARILLO, TEXAS, ASSIGNOR TO EDGAR H. PETTY, OF AMARILLO, TEXAS

COTTON HARVESTER

Application filed August 30, 1930. Serial No. 478,977.

This invention relates to a machine for harvesting cotton, one of the objects being to provide a structure of this character adapted to be propelled over a field of standing plants and which has means combined therewith whereby the plants will be pulled upwardly so as to detach the open ripe bolls from the plants.

A further object is to provide pulling means in the form of a plurality of fingers adapted to comb through the upper and lower portions of the plants, said fingers being operated by the movement of the machine as it advances over the field.

A still further object is to provide simple and efficient means for conducting the cotton from the pulling means to a separator where the cotton fibers will be separated from the bolls and trash and subsequently delivered into a receptacle provided therefor.

A further object is to provide a machine of this character all parts of which will be actuated by one or more of the supporting wheels of the machine as said machine travels over the field.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 4 is a central vertical longitudinal section.

Figure 5 is a section on line 5—5 of Figure 4, the fan being shown in elevation.

Figure 6 is a horizontal section through the concave showing the separating elements therein.

Figure 1:
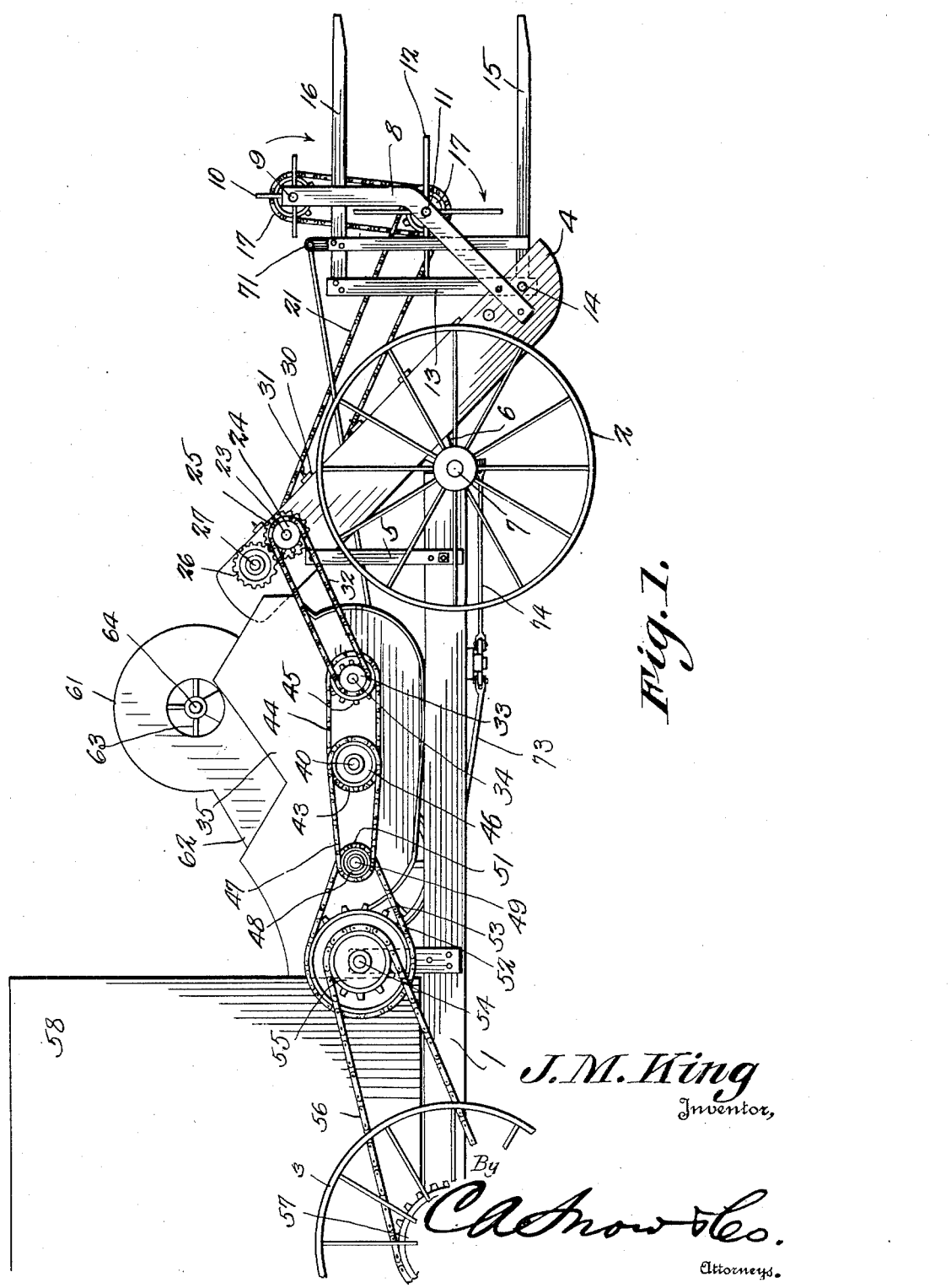
Figure 1 is a side elevation showing one side of the machine, the rear portion thereof being broken away.

Referring to the figures by characters of reference 1 designates the main frame of the machine provided with supporting wheels 2 and 3, the wheels 2 constituting means whereby the machine can be guided in any direction desired while one of the wheels 3 can constitute a driving element.

Supported on the front end portion of frame 1 is an inclined elevator frame 4 the lower end of which is extended close to the ground. This elevator frame can be partly supported by standards 5 secured to the frame 1 and can also be supported by brackets 6 extending from the frame 4 and mounted on the front axle 7. Forwardly and upwardly inclined arms 8 are connected to the lower portions of the sides of the frame 4 and journaled in the upper portions of these arms is a shaft 9 having stripping fingers 10 radiating therefrom. Another transverse shaft 11 is journaled within the arms 8 at intermediate points and this shaft also has stripping arms 12 radiating therefrom. The arms 12 are preferably longer than the arms 10.

Pivotally connected to the lower end portions of the sides of frame 4 is an upstanding frame 13, the pivot for said upstanding frame being indicated at 14. This frame 13 has a series of lower combing fingers 15 extending forwardly therefrom while another set of forwardly extending combing fingers 16 project from the upper portion of the frame 13. The stripping fingers 10 are located above the combing fingers 16 while the stripping fingers 12 are located between the two sets of combing fingers 15 and 16.

Figure 2:
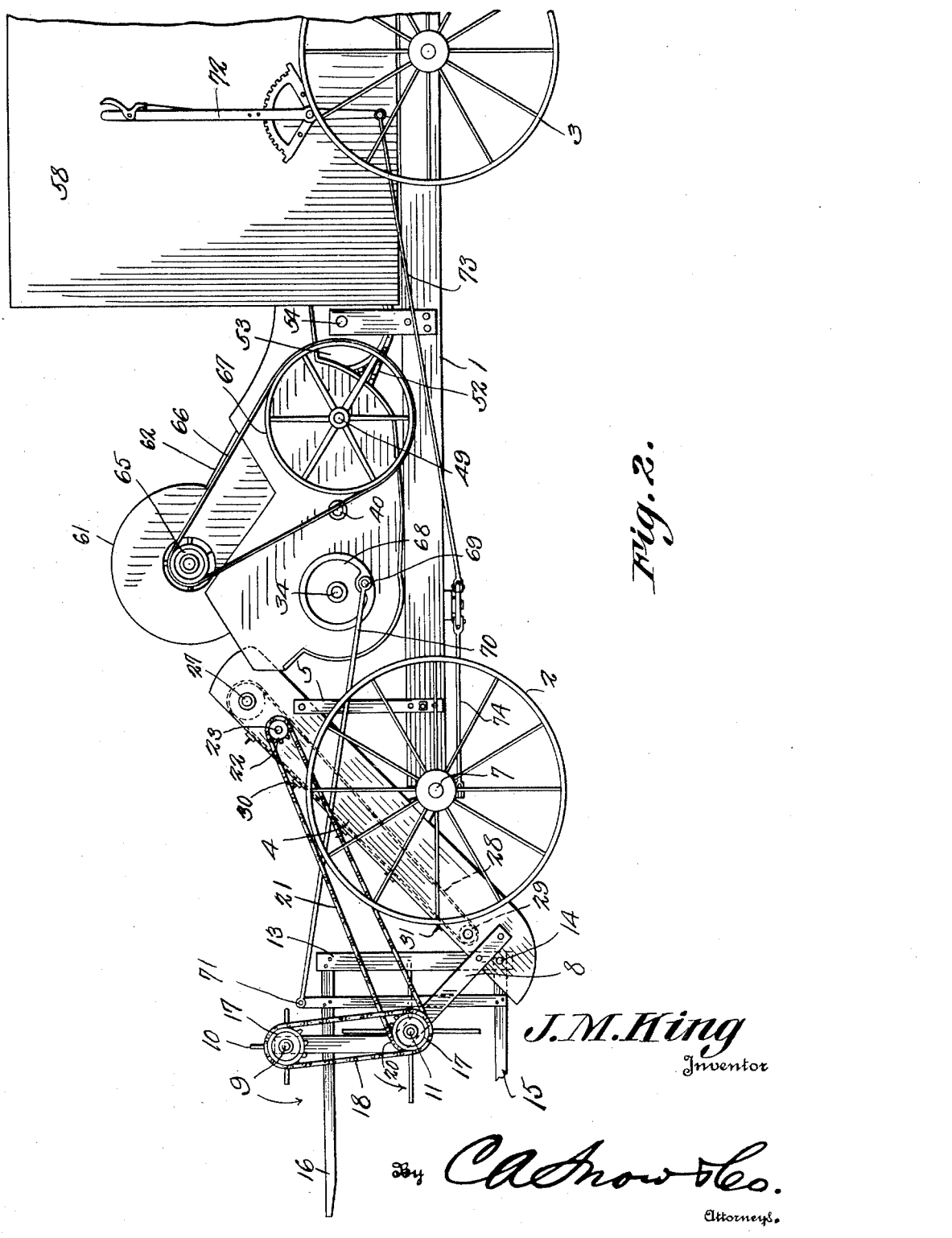
Figure 2 is a similar view showing the opposite side of the machine.
Figure 3:
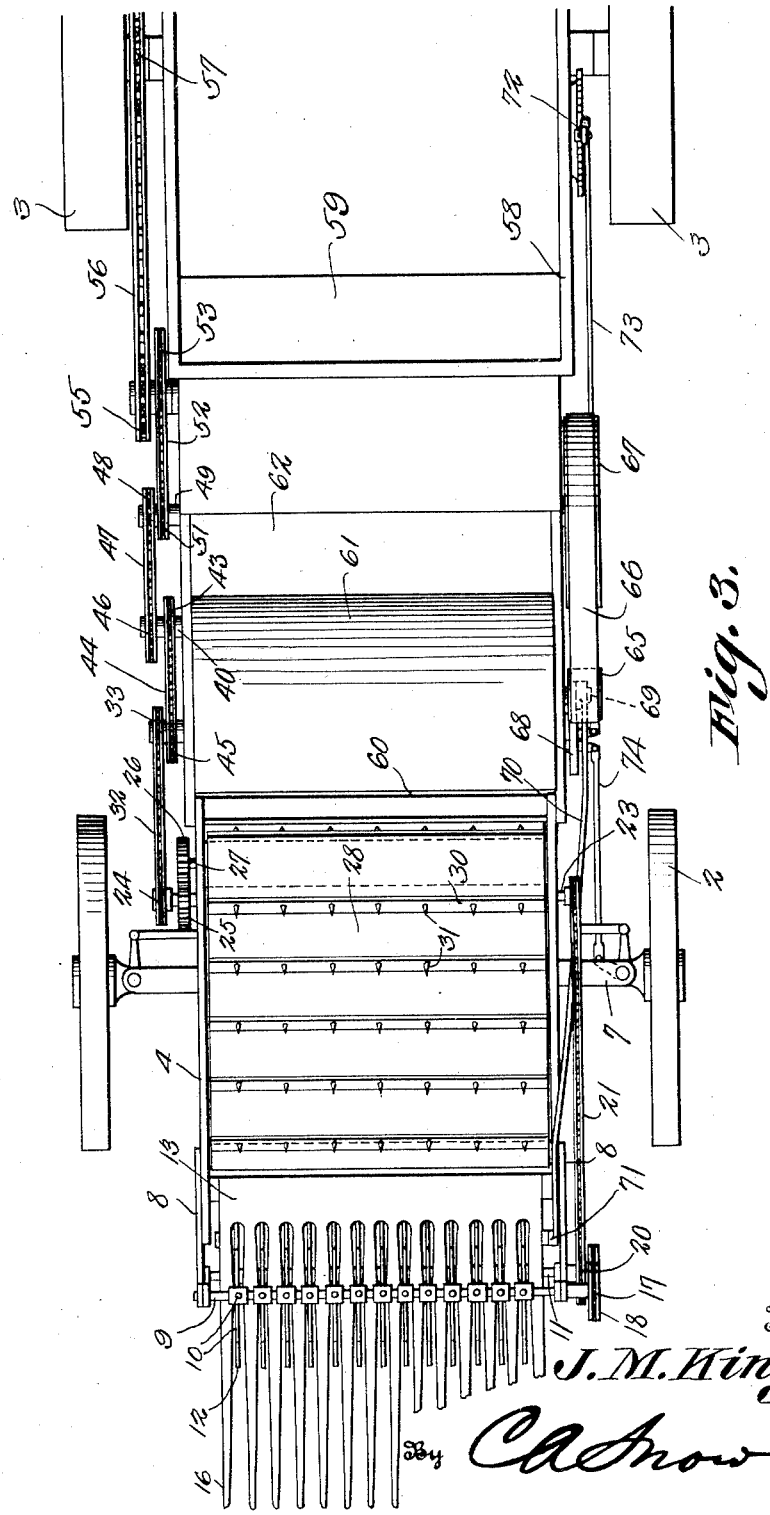
Figure 3 is a top plan view.

Sprockets 17 are attached to the shafts 9 and 11 respectively and are engaged by a chain 18 whereby the two shafts are caused to rotate in the same direction as indicated by the arrow in Figures 1 and 2.

Another sprocket 20 is carried by the shaft 11 and is adapted to receive motion through a chain 21 from a sprocket 22 secured to a shaft 23 extending transversely within the upper portion of the inclined frame 4. To the other end portion of this shaft 23 is secured a sprocket 24 and a gear 25. Gear 25 meshes with another gear 26 secured to a transverse shaft 27 and mounted on this shaft is an endless elevator belt 28 the lower portion of which is mounted on a transverse roller 29 within the lower portion of the frame 4. The conveyor belt has transverse cleats 30 thereon from which are extended teeth 31.

The sprocket 24 is engaged by an endless chain 32 receiving motion from a sprocket 33 secured to a transverse shaft 34. This shaft extends transversely through the housing 35 of a concave 36. A cylinder 37 is secured to the shaft 34 and is provided with radial fingers 38 cooperating with stationary fingers 39 extending inwardly from the concave 36. Another shaft 40 is extended transversely of the housing 35 and carries a cylinder 41 provided with radial fingers 42. Shaft 40 has a sprocket 43 secured to one end for transmitting motion through a chain 44 to a sprocket 45 secured to the shaft 34.

A sprocket 46 is secured to the shaft 40 and is adapted to receive motion through a chain 47 from a sprocket 48 secured to a shaft 49. This last mentioned shaft is extended transversely through the housing 35 and is provided with a cylindrical brush 50. Another sprocket 51 is carried by shaft 49 and receives motion through a chain 52 from a sprocket 53 secured to a shaft 54 suitably supported on the frame 1. Another sprocket 55 is carried by the shaft 54 and receives motion through a chain 56 from a sprocket 57 rotatable with one of the wheels 3.

A box 58 is erected on the frame 1 and the housing 35 has a delivering spout 59 at one end which opens into this box. A receiving hopper 60 is located at the other end of the housing under the upper or delivery end portion of the elevator belt 28. A blower casing 61 is supported above the housing 35 and has an outlet spout 62 adapted to deliver an air blast into the housing 35 above brush 50 and in the direction of the spout 59. A fan 63 is mounted for rotation within the housing 61 and is carried by a shaft 64. This shaft is driven by a pulley 65 which receives motion through a belt 66 from a pulley 67 secured to the shaft 49 of brush 50. The shaft 34 of cylinder 37 has a wheel 68 secured to one end thereof, this wheel being provided with a wrist pin 69 on which is mounted one end of a drive rod or pitman 70. Said pitman is attached to the upper portion of the frame 13 as shown at 71. Thus it will be seen that when the wheel 16 is rotated the frame 13 will be swung back and forth about its pivot 14 and the combing fingers 15 and 16 will be swung upwardly and downwardly.

Any suitable means may be provided for guiding the machine. For example a lever 72 can be fulcrumed at any suitable point on the machine where it can be readily grasped and actuated by the driver. One end of this lever is connected by a rod 73 to mechanism indicated generally at 74 whereby the wheels 2 can be turned to the right or to the left. Inasmuch as the steering mechanism constitutes no part of the present invention detailed illustration of description thereof is not deemed essential.

When the machine constituting the present invention is propelled along a field it can be caused to straddle one or more rows of standing plants. During the forward movement of the machine motion will be transmitted from the wheel 3 to the cylinders 37 and 41, to the brush 50 and to the fan 63. Motion will also be transmitted to the elevating belt 28 and the frame 13 will be swung upon its pivot 14. Thus the fingers 15 will travel within the lower portions of the standing plants while the fingers 16 will travel within the upper portion of the plants. As these fingers are travelling forwardly in the plants they will be swung upwardly, and downwardly thereby combing through the plants and pulling the ripe bolls therefrom. At the same time the stripping fingers 10 and 12 which are rotating in the direction indicated by the arrows, will throw the loosened or detached bolls backwardly onto the elevating belt 28. This belt will convey the bolls upwardly, the teeth 31 serving to bite into the bolls so as to properly engage them.

When the bolls reach the uppermost portion of the elevator they will fall by gravity into the hopper 60 and into the path of the rotating fingers 38. These fingers, cooperating with the stationary fingers 39, will break up the bolls so as to separate the hulls from the cotton fibers. Breaking actions will also be carried on by the fingers 42 which work between the fingers 38. Finally, after the hulls and trash have been separated from the cotton fibers, the brush 50 will expel the fibers into the spout 39 where they will be ejected by the air blast from the spout 62. The hulls and trash separated from the cotton will fall out of the concave through openings 75 provided for that purpose.

It has been found in practice that by providing a machine such as described a large acreage can be covered in a single day and the cotton will not only be quickly and efficiently picked from the plants but will also be separated from the trash and hulls.

What is claimed is:

1. A cotton harvester including a wheel supported frame movable along a row of standing plants, connected superposed series of combing fingers, and means operated by the forward movement of the machine for swinging the fingers upwardly and downwardly to comb the plants in the path thereof.

2. A cotton harvester including a wheel supported frame mounted for movement along a row of standing plants, upper and lower series of combing fingers fixedly connected, and means operated by the forward movement of the vehicle for swinging all of the fingers about a transverse axis, thereby to comb upwardly and downwardly through the standing plants.

3. A cotton harvester including a wheel supported structure mounted for movement along a row of standing plants, fixedly connected upper and lower series of combing fingers pivotally attached to the structure, means operated by the forward movement of said structure for swinging said fingers about their point of attachment with the structure, thereby to comb upwardly through the standing plants in the paths thereof, and rotatable stripping means adjacent the fingers of each series.

4. A cotton harvester including a wheel supported structure movable along a row of standing plants, connected upper and lower series of combing fingers, a rotatable stripping element close to each series of combing fingers, and separate means operated by the forward movement of the structure for swinging all of the fingers simultaneously about a transverse axis thereby to comb upwardly through the plants in the path thereof and for rotating the stripping elements to propel the cotton from the combing fingers backwardly onto the structure.

5. A cotton harvester including upper and lower series of combing fingers, means for propelling said fingers along and through a row of standing plants, and means for oscillating all of the fingers simultaneously upwardly and downwardly while in engagement with the plants, thereby to strip cotton therefrom.

In testimony that I claim the foregoing as my own, I have hereto affixed my signature.

JOHN M. KING.